3 Sheets—Sheet 1

H. SMITH.
Reed for Musical Instrument.

No. 233,038. Patented Oct. 5, 1880.

Witnesses
J. M. Deemer
Harry Smith

Inventor
Hermann Smith
by his Attorneys
Howson and Son

3 Sheets—Sheet 2.

H. SMITH.
Reed for Musical Instrument.

No. 233,038. Patented Oct. 5, 1880.

Witnesses
J. M. Deemer.
Harry Smith

Inventor
Hermann Smith
by his Attorneys
Howson and Son

H. SMITH.
Reed for Musical Instrument.
No. 233,038. Patented Oct. 5, 1880.
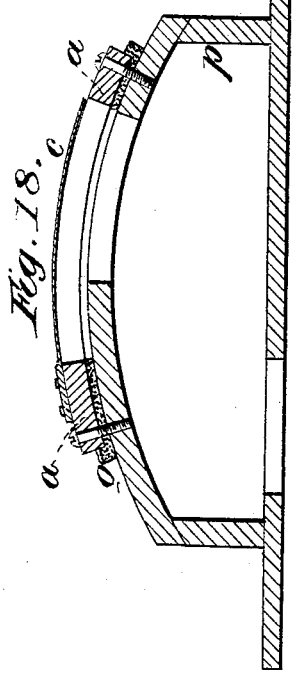
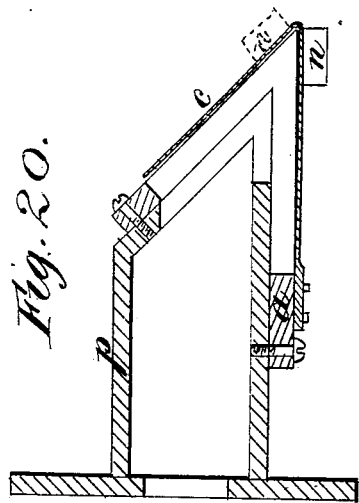
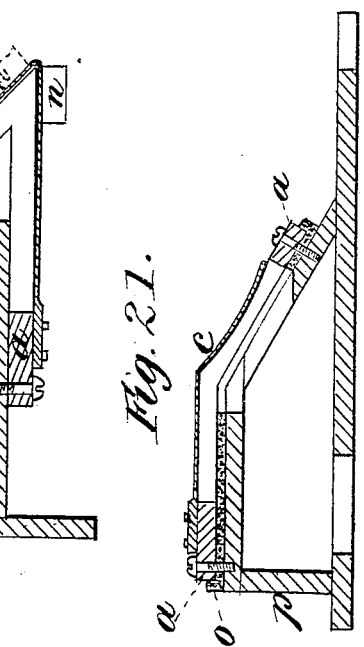
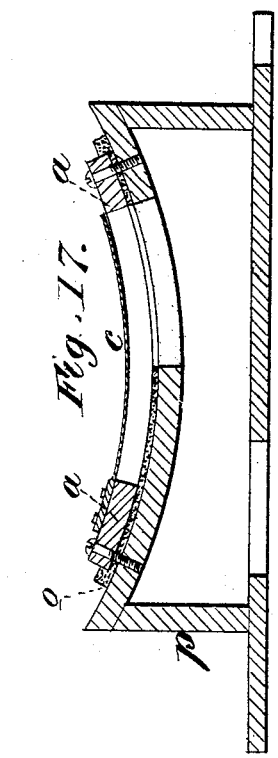
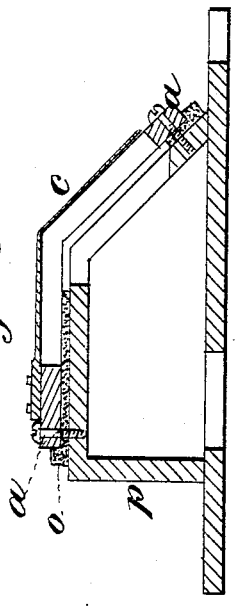
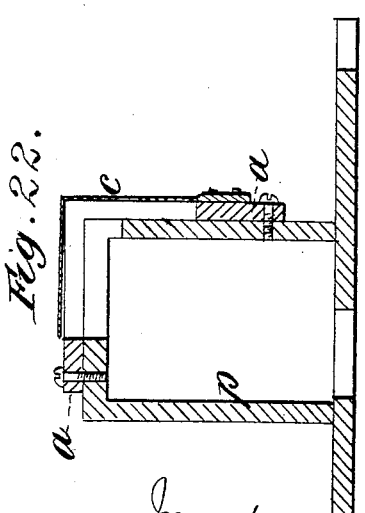
Witnesses
J. M. Deemer.
Harry Smith
Inventor
Hermann Smith
by his Attorneys
Howson and Son
N. PETERS, PHOTO-LITHOGRAPHER, WASHINGTON, D. C.

UNITED STATES PATENT OFFICE.

HERMANN SMITH, OF CANTERBURY, ENGLAND.

REED FOR MUSICAL INSTRUMENTS.

SPECIFICATION forming part of Letters Patent No. 233,038, dated October 5, 1880.

Application filed February 2, 1880. Patented in England December 3, 1878.

*To all whom it may concern:*

Be it known that I, HERMANN SMITH, a subject of the Queen of Great Britain and Ireland, and residing at Canterbury, in the county of Kent, England, have invented certain Improvements in Reeds for Musical Instruments, (for which I obtained British Letters Patent No. 4,942, dated December 3, 1878,) of which the following is a specification.

My said invention relates to improvements in reeds for harmoniums, organs, and other musical instruments, whereby an increased range of variations in qualities is obtained and greater promptness of speech is secured under extended methods of voicing.

In reeds as ordinarily constructed, known as "free reeds," the frame of the reed is made with a level surface. Now, according to my invention I make additions to and modifications in the shape or form of the frames, and also the tongues of reeds in conformity therewith, as hereinafter described.

Figure 11:
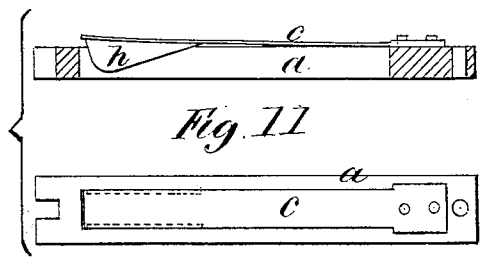
Figure 12:
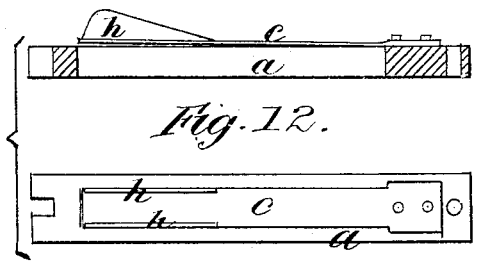
Figure 13:
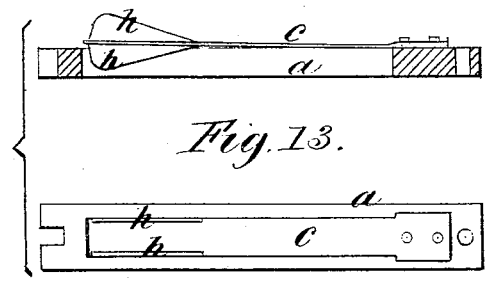
Figure 14:
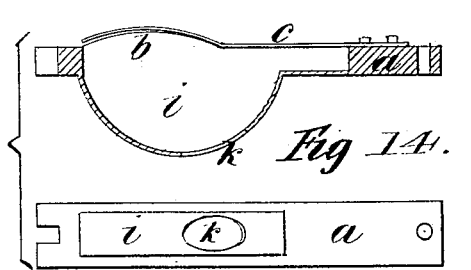
Figure 15:
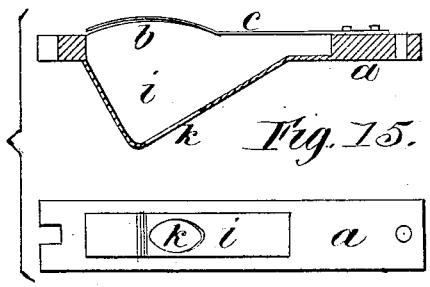
Figure 16:
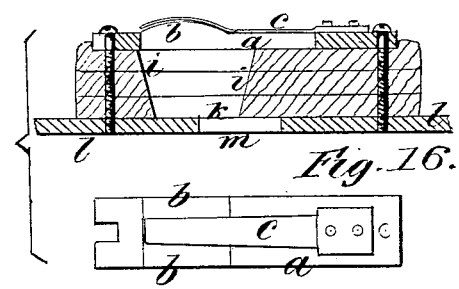

In the accompanying sheets of drawings, Figures 1 to 22 represent different modifications of my said invention, Figs. 1 to 10 being side elevations and plans of the upper side of reed-frames and tongues; Figs. 11, 12, and 13, longitudinal sections and plans; Figs. 14 and 15, longitudinal sections and plans of the under side; Fig. 16, a longitudinal section and a plan of the upper side, and Figs. 17 to 22 longitudinal sections of reeds and reed-frames on their channels or boxes.

Figure 1:
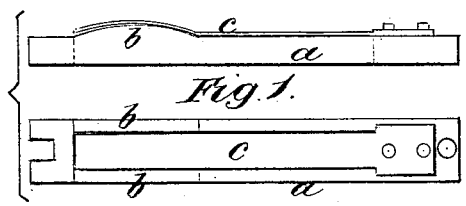
Figure 2:
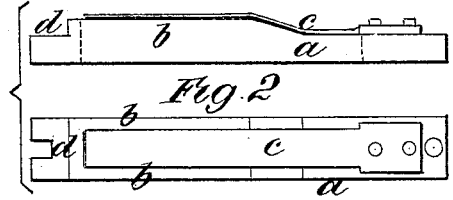

One mode of carrying out my said invention, in order to effect the before-mentioned objects, is illustrated in Figs. 1 and 2 of my drawings. I add to each side of the upper surface of the reed-frame $a$ a raised piece, $b$, of metal or other suitable material, so shaped as to conform very nearly to the bend or curve given to the tongue $c$, and in the case of the arrangement, Fig. 2, the raised pieces $b$ are continued so as to form an inclosure round the tip, as shown at $d$.

Figure 3:
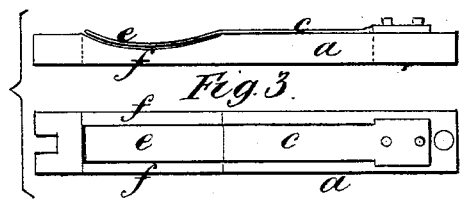

According to another modification, which is illustrated in Fig. 3, I bend or curve the tongue as shown at $e$, so as to have a set lower than the level of the root, forming the upper surface of the frame of such a shape at $f$ that it very nearly conforms to the bend or curve of the tongue so modified.

Figure 4:
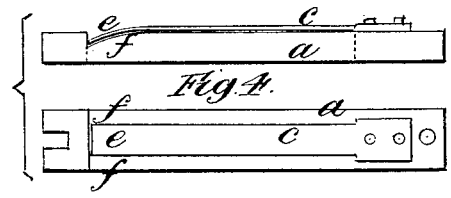
Figure 5:
Figure 6:
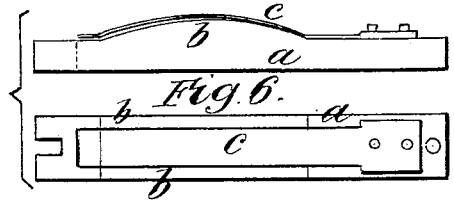
Figure 7:
Figure 8:

Figs. 4 and 5 are other varieties of reed-frames having depressions to carry out the same principle. Figs. 6, 7, and 8 are modifications in the frame, showing elevations of a form carried to greater extremes than those indicated in Figs. 1 and 2.

Figures 9, 10:
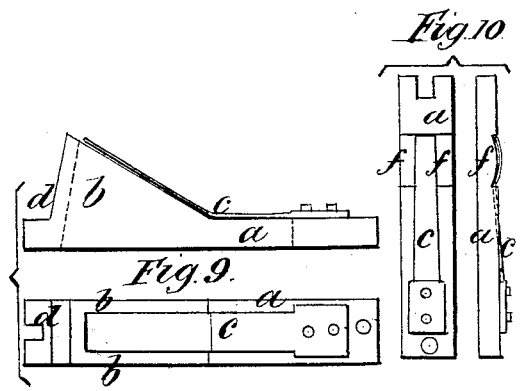

For some reeds, and particularly in the higher ranges, the forms shown in Fig. 10 are suitable. In the frames $a$ of these a small curve is cut near the tip, as shown at $f$, and the tongue $c$ in Fig. 10 follows that curve.

In the arrangements hereinbefore described the bends or curves may be situate at parts of the tongue other than the tip, and their shape may be varied as required.

As general indications of the characteristics of these reeds, it may be mentioned that the arrangement, Fig. 1, favors the production of horn quality of tone, Fig. 2 "cremona," Fig. 3 flute-like, Fig. 4 cornet, Fig. 5 string quality, and Figs. 6, 7, and 8 may be taken as trombone and clarionet. The particular results will, however, depend upon the scales of reed used and their treatment, and the skill of the voicer in adapting each kind to its purpose.

According to a further modification, which is illustrated in Figs. 11, 12, and 13, I form two thin projections, $h$, (by preference of a triangular shape,) on the side of the tongue near the tip, one at each side thereof. In Fig. 11 these projections are shown on the under side, in Fig. 12 on the upper side, while in Fig. 13 they are shown as applied at both sides, the deepest part of the projections—*videlicet*, that situate at the tip—is about equal to the depth of the frame. The projections thence gradually diminish until they are in the line of the tongue; but the shape and positions of these projections may be varied as found expedient. This arrangement admits of the tongue being set much higher than in the ordinary manner, and the air is almost excluded from attack at the sides and has to pass in front of the tip. This modification is particularly suitable for very light reeds to which it is desired to give a stringy or breezy quality of tone.

Another improvement, which is illustrated in Figs. 14, 15, and 16, consists in forming a cup or hollow inclosure, $i$, on the under side of the reed-frame $a$, with an aperture, $k$, at a given point, or made adjustable in position, the situation of the aperture determining the relation in which the draft of air acts upon the tongue and influencing the quality of tone given. This cup or hollow inclosure may either be formed in one with the frame, as shown in Figs. 14 and 15, or may be an addition of other material, as in Fig. 16. In the latter case I may make it of india-rubber or of several thicknesses of felt, as shown, so cut as to form the shape of cup or inclosure desired with the required position of aperture. In some cases this aperture may be toward the extreme root or toward the extreme tip of the reed. A simple means is shown in Fig. 16 of regulating the aperture of the cup by moving a slide, $l$, of leather or other suitable material, having an aperture, $m$, which may be either made to coincide with the aperture $k$ or to cut off the same to a greater or less extent, as required.

It will be obvious that according to the position of the aperture, whether so as to direct a current of air forward of the tip of the tongue or at any determined point between that and the root, the play of the tongue is so influenced that differences of quality result. These cup-like additions to the under surface of the frame are distinct and separate from the channel or tube proper of the instrument, but may be so arranged as to be fixed either above or within the same.

In the arrangement of reeds hereinbefore described the under surface of the frame $a$ is a straight and level line. Figs. 17 to 22 show modifications in which the reed-frame itself, throughout its whole length, or for a portion of its length, has distinct forms, arched, bowed, or curved, and also angular forms in various degrees of inclination of one-half or other relation of or to the whole length of the frame below the remaining part, and the tongue is bent or formed to follow or nearly follow the forms so determined or given to the frame.

In Figs. 17 and 18 the frames $a$ are arched, concave, and convex. In Figs. 19 to 22 they are made in angular forms, and in order to modify pitch a block of brass or lead may be added to the tongue $c$ at or near the bend, as shown at $n$ in Fig. 20. In order to obviate risk of defective fitting, a layer or layers of felt, $o$, are, by preference, interposed between the reed-frames $a$, and the boxes $p$ made to correspond with them, as shown in Figs. 17, 18, 19, and 21.

It is obvious that the various improvements or devices hereinbefore described may also be combined, and that two reeds of different forms may be united together and used upon one channel in order to produce a compound quality of tone.

The invention is applicable to instruments operating either by pressure or by suction, and to beating-reeds as well as to free reeds, also to reeds operating under the agency of electricity or magnetism in conjunction with the action of wind.

I claim as my invention—

1. The herein-described reed, having the reed-tongue bent or curved and the upper edge of the reed-frame conformed to the bend or curve of the tongue, substantially as and for the purpose set forth.

2. A reed for musical instruments, having a tongue provided with thin projections or wings $h$ near the tip, one on each side, as described.

3. A reed for musical instruments, having a cup or hollow inclosure on the under side of the frame distinct from the channels or tubes proper of the instrument, substantially as specified.

4. A reed having a curved or bent tongue and a correspondingly-shaped frame with a cup or hollow inclosure on the under side, as and for the purpose set forth.

HERMANN SMITH.

Witnesses:
F. C. DYER,
CHAS. MILLS,
Both of 47 Lincoln's Inn Fields, London.